US012748838B2

(12) United States Patent
Itzhak et al.

(10) Patent No.: US 12,748,838 B2
(45) Date of Patent: Sep. 29, 2026

(54) TRAINING A MODEL BASED ON SOFT LABELING

(71) Applicant: PALO ALTO NETWORKS (ISRAEL ANALYTICS) LTD., Tel Aviv (IL)

(72) Inventors: Gal Itzhak, Holon (IL); Yinnon Meshi, Kibbutz Revivim (IL); Tuvia Newman, Kiryat Gat (IL); Niv Sela, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 224 days.

(21) Appl. No.: 18/609,049

(22) Filed: Mar. 19, 2024

(65) Prior Publication Data

US 2025/0298888 A1 Sep. 25, 2025

(51) Int. Cl.
*G06F 21/55* (2013.01)
*G06N 20/00* (2019.01)

(52) U.S. Cl.
CPC ........... *G06F 21/554* (2013.01); *G06N 20/00* (2019.01); *G06F 2221/034* (2013.01)

(58) Field of Classification Search
CPC ............. G06F 21/554; G06F 2221/034; G06F 21/577; G06F 21/552; G06N 20/00; H04L 63/1433; H04L 63/1416
See application file for complete search history.

(56) References Cited

U.S. PATENT DOCUMENTS 9,923,912 B2 * 3/2018 Franc .................. H04L 63/0281
10,116,680 B1 * 10/2018 Han ...................... G06F 21/566
11,468,358 B2 10/2022 Amit et al.
11,533,126 B1 * 12/2022 Müller-Weinfurtner ..................... H04L 1/0048
11,762,729 B2 * 9/2023 Shibayama ......... G06F 11/0793 714/2
12,482,255 B1 * 11/2025 Azad ........................ G06N 3/08
2014/0165207 A1 6/2014 Engel et al.
(Continued)

OTHER PUBLICATIONS

Abdoli et al., Intrusion detection system using soft labeling and stacking ensemble, Springer, Oct. 2022.*
(Continued)

*Primary Examiner* — David Garcia Cervetti
(74) *Attorney, Agent, or Firm* — Meitar Patents LTD.; Daniel Kligler

(57) ABSTRACT

A method for cybersecurity includes receiving a corpus of cyber incidents, each including (i) one or more alerts indicative of suspicious activities in one or more computer systems, and (ii) one or more features characterizing the cyber incident. Binary labels respectively assigned to the cyber incidents of the corpus are further received, each of the binary labels having a first value indicating the cyber incident is benign, or a second value indicating the cyber incident is malicious. Predefined labeling rules that map the binary labels to respective soft labels that are indicative of suspiciousness levels of the cyber incidents are held. The binary labels are mapped to respective soft labels, based at least on the predefined labeling rules. The cyber incidents of the corpus and the respective soft labels are provided for training a machine learning model that, when trained, predicts risk scores for cyber incidents outside the corpus.

19 Claims, 6 Drawing Sheets

(56) References Cited

U.S. PATENT DOCUMENTS

| | | | | |
|---|---|---|---|---|
| 2015/0134947 | A1* | 5/2015 | Varcoe | H04L 9/0852 713/150 |
| 2015/0358344 | A1 | 12/2015 | Mumcuoglu et al. | |
| 2015/0379025 | A1* | 12/2015 | Flores | G06F 16/86 707/694 |
| 2017/0270412 | A1* | 9/2017 | Nakata | G06N 5/025 |
| 2018/0191765 | A1* | 7/2018 | Cho | H04L 63/1433 |
| 2019/0155802 | A1* | 5/2019 | Miller | G06F 16/2372 |
| 2019/0244062 | A1* | 8/2019 | Chao | G06F 3/017 |
| 2019/0297097 | A1* | 9/2019 | Gong | G06F 21/564 |
| 2019/0379677 | A1* | 12/2019 | Zenz | G06F 21/554 |
| 2020/0242250 | A1* | 7/2020 | Chen | G06N 3/09 |
| 2020/0372632 | A1* | 11/2020 | Chauhan | G06T 7/0012 |
| 2021/0166151 | A1* | 6/2021 | Kennel | G06N 7/01 |
| 2021/0374501 | A1* | 12/2021 | Zhang | G06N 3/09 |
| 2021/0374553 | A1* | 12/2021 | Li | G06N 3/088 |
| 2022/0004928 | A1* | 1/2022 | Liu | G06V 10/70 |
| 2022/0021705 | A1* | 1/2022 | Brurok | H04L 63/1425 |
| 2022/0103590 | A1* | 3/2022 | Steimberg | H04L 63/14 |
| 2022/0188690 | A1* | 6/2022 | Rawat | G06V 10/82 |
| 2022/0198136 | A1* | 6/2022 | Peleg | G06F 40/253 |
| 2022/0245470 | A1* | 8/2022 | Acharya | G06N 5/025 |
| 2022/0343115 | A1* | 10/2022 | Kanta | G06F 18/24 |
| 2022/0360597 | A1* | 11/2022 | Fellows | G06F 21/577 |
| 2022/0407882 | A1* | 12/2022 | Neuvirth | H04L 63/1441 |
| 2023/0060593 | A1* | 3/2023 | Abelha Ferreira | G06F 16/358 |
| 2023/0224311 | A1* | 7/2023 | Meshi | H04L 63/1408 726/22 |
| 2023/0229738 | A1* | 7/2023 | Cleere | G06F 18/23 706/12 |
| 2023/0274003 | A1* | 8/2023 | Liu | G06F 21/577 726/26 |
| 2023/0315844 | A1* | 10/2023 | Roytman | G06F 21/554 726/23 |
| 2023/0351732 | A1* | 11/2023 | Story | G06V 10/761 |
| 2024/0061936 | A1* | 2/2024 | Pan | G06N 3/08 |
| 2024/0119260 | A1* | 4/2024 | Wang | G06N 3/045 |
| 2024/0177833 | A1* | 5/2024 | Galeotti | G06T 7/10 |
| 2025/0005453 | A1* | 1/2025 | Amid | G06N 3/045 |
| 2025/0028818 | A1* | 1/2025 | Kim | G06F 16/243 |
| 2025/0028823 | A1* | 1/2025 | Kim | G06F 21/563 |
| 2025/0028825 | A1* | 1/2025 | Kim | G06F 21/56 |
| 2025/0028826 | A1* | 1/2025 | Kim | G06F 21/565 |
| 2025/0028827 | A1* | 1/2025 | Kim | G06F 21/565 |
| 2025/0030704 | A1* | 1/2025 | Kim | H04L 63/1416 |
| 2025/0030744 | A1* | 1/2025 | Stride | H04L 63/1433 |
| 2025/0071130 | A1* | 2/2025 | Kim | H04L 63/126 |
| 2025/0111269 | A1* | 4/2025 | Aguiar Junior | G06N 20/00 |
| 2025/0111270 | A1* | 4/2025 | Aguiar Junior | G06N 20/00 |
| 2025/0141895 | A1* | 5/2025 | Datla | H04L 63/1416 |
| 2025/0298888 | A1* | 9/2025 | Itzhak | G06F 21/554 |
| 2025/0317460 | A1* | 10/2025 | Mammadli | H04L 63/1441 |
| 2025/0342492 | A1* | 11/2025 | Brown | G06Q 10/02 |
| 2025/0363133 | A1* | 11/2025 | Maughan | G06F 16/2468 |
| 2025/0378336 | A1* | 12/2025 | Galvin | G06N 3/045 |
| 2026/0010836 | A1* | 1/2026 | Canim | G06N 20/20 |
| 2026/0037620 | A1* | 2/2026 | Gdula | G06F 21/554 |

OTHER PUBLICATIONS

Shao et al., Labeling Malicious Communication Samples Based on Semi-Supervised Deep Neural Network, China Communications, IEEE, Nov. 2019.*

Papernot et al., Distillation as a Defense to Adversarial Perturbations against Deep Neural Networks, IEEE, 2016.*

Yan et al., A Survey of Adversarial Attack and Defense Methods for Malware Classification in Cyber Security, IEEE, 2022.*

Abdoli et al., Intrusion detection system using soft labeling and stacking ensemble, Springer, Oct. 2022. (Year: 2022).*

Shao et al., Labeling Malicious Communication Samples Based on Semi-Supervised Deep Neural Network, China Communications, IEEE, Nov. 2019. (Year: 2019).*

Papernot et al., Distillation as a Defense to Adversarial Perturbations against Deep Neural Networks, IEEE, 2016. (Year: 2016).*

Yan et al., A Survey of Adversarial Attack and Defense Methods for Malware Classification in Cyber Security, IEEE, 2022. (Year: 2022).*

Francois., "Pac Learning from Positive Statistical Queries", ALT '98 Proceedings of the 9th International Conference on Algorithmic Learning Theory, pp. 112-126, Oct. 8-10, 1998.

Settles., "Active Learning Literature Survey", Computer Sciences Technical Report 1648, University of Wisconsin-Madison, pp. 1-67, Jan. 26, 2010.

Dhagat., "PAC learning with irrelevant attributes", Proceedings of the IEEE Symposium on Foundation of Computer Science, pp. 1-11, year 1994.

Chvatal., "A Greedy Heuristic for the Set-Covering Problem", Mathematics of Operations Research, vol. 4, issue 3, pp. 233-235, Aug. 1979.

Schapire., "The Strength of Weak Learnability", Machine Learning, vol. 5, pp. 197-227, year 1990.

Dawid et al., "Maximum Likelihood Estimation of Observer Error-Rates Using the EM Algorithm", Journal of the Royal Statistical Society Series C (Applied Statistics), vol. 28, No. 1, pp. 20-28, year 1979.

Blum et al., "Combining Labeled and Unlabeled Data with CoTraining", COLT' 98 Proceedings of the 11th annual conference on Computational learning theory, pp. 92-100, year 1998.

Kearns et al., "Cryptographic limitations on learning Boolean formulae and finite automata", Proceedings of the 21st Annual ACL Symposium on Theory of Computing, vol. 21, pp. 1-44, May 14-17, 1989.

Valiant., "A theory of the learnable", Communications of the ACM, vol. 27, No. 11, pp. 1134-1142, year 1984.

Dempster., "Maximum Likelihood from Incomplete Data via the EM Algorithm", Journal of the Royal Statistical Society, Series B (Methodological), vol. 39, No. 1, pp. 1-38, year 1977.

Ratner., "Data Programming:Creating Large Training Sets, Quickly", pp. 1-27, May 26, 2016 (downloaded from https://arxiv.org/abs/1605.07723).

Coraluppi et al., "Stochastic Signal Representation", IEEE Transactions on Circuit Theory, vol. 16, issue 2, pp. 155-161, May 1969.

Palo Alto Networks, Inc., "Cortex XDR—Palo Alto Networks Named a Leader by Gartner for Cortex XDR," pp. 1-17, update Feb. 25, 2024, as downloaded from https://web.archive.org/web/20240225171843/https://www.paloaltonetworks.com/cortex/cortex-xdr.

* cited by examiner

TRAINING A MODEL BASED ON SOFT LABELING

TECHNICAL FIELD

Embodiments described herein relate generally to computer security, and particularly to methods and systems for training a prioritization model by assigning soft labels to cyber incidents that are used for the training and are related to unusual user and entity behavior.

BACKGROUND

Security operations centers (SOCs) comprise facilities where teams of information technology (IT) professionals monitor, analyze and protect organizations from cyber-attacks. In the SOC, internet traffic, networks, desktops, servers, endpoint devices, databases, applications, and other systems are continuously monitored for signs of a security incident. In operation, SOCs can reduce the impact of potential data breaches by helping organizations respond to intrusions quickly.

To assist the SOC analysts with incident handling prioritization, incidents may be reported to the SOC accompanied with respective risk scores produced by a previously trained model.

The description above is presented as a general overview of related art in this field and should not be construed as an admission that any of the information it contains constitutes prior art against the present patent application.

SUMMARY

An embodiment that is described herein provides a method for cybersecurity, including receiving a corpus of cyber incidents, each cyber incident including (i) one or more alerts indicative of suspicious activities in one or more computer systems, and (ii) one or more features characterizing the cyber incident. Binary labels respectively assigned to the cyber incidents of the corpus are further received, each of the binary labels having a first value indicating the respective cyber incident is benign, or a second value indicating the respective cyber incident is malicious. One or more predefined labeling rules that map the binary labels to respective soft labels that are indicative of suspiciousness levels of the cyber incidents are held. The binary labels are mapped to respective soft labels, based at least on the predefined labeling rules. The cyber incidents of the corpus and the respective soft labels are provided for training a machine learning model that, when trained, predicts risk scores for cyber incidents outside the corpus.

In some embodiments, the suspicious activities include suspicious behavioral activities of users and entities occurring in the computer systems. In other embodiments, mapping the binary labels includes mapping, at least some of the binary labels having the first value to a soft first value, and mapping at least some of the binary values having the second value to a soft second value higher than the soft first value. In yet other embodiments, mapping the binary labels includes mapping, using the labeling rules, binary labels of cyber incidents having features corresponding to the predefined labeling rules, to respective soft labels having values higher than the soft second value.

In an embodiment, the method includes holding one or more functions, that when applied, modify the soft labels depending on the features of respective cyber incidents, and for a cyber incident having a feature corresponding to a given function among the one or more functions, adjusting the corresponding soft label by applying the given function to the soft label and to a numerical value of the feature. In other embodiments, the method includes bounding the soft labels to values between predefined low and high limits. In yet other embodiments, the method includes providing the trained model for assigning risk scores to incidents detected in a computer system.

There is additionally provided, in accordance with an embodiment that is described herein, an apparatus for cybersecurity, including an interface and a processor. The interface is configured to receive a corpus of cyber incidents, each cyber incident including (i) one or more alerts indicative of suspicious activities in one or more computer systems, and (ii) one or more features characterizing the cyber incident, and to further receive binary labels respectively assigned to the cyber incidents of the corpus, each of the binary labels having a first value indicating the respective cyber incident is benign, or a second value indicating the respective cyber incident is malicious. The processor is configured to hold one or more predefined labeling rules that map the binary labels to respective soft labels that are indicative of suspiciousness levels of the cyber incidents, to map the binary labels to respective soft labels, based at least on the predefined labeling rules, and to provide the cyber incidents of the corpus and the respective soft labels for training a machine learning model that, when trained, predicts risk scores for cyber incidents outside the corpus.

There is additionally provided, in accordance with an embodiment that is described herein, method for cybersecurity, including, holding a machine learning model that was trained based on soft labels derived from binary labels assigned to respective cyber incidents, each of the binary labels has a first value indicating the respective cyber incident is benign, or a second value indicating the respective incident is malicious, and the soft labels are indicative of suspiciousness levels of the cyber incidents. A given cyber incident that includes an alert corresponding to one or more suspicious behavioral activities in a computer system is generated. A risk score is assigned to the given cyber incident using the trained machine learning model, and a responsive action is initiated responsively to the risk score.

In some embodiments, generating the given cyber incident includes generating or updating the given cyber incident so as to include at least the alert.

There is additionally provided, in accordance with an embodiment that is described herein, an apparatus for cybersecurity, including a memory and a processor. The memory is configured to hold a machine learning model that was trained based on soft labels derived from binary labels assigned to respective cyber incidents, each of the binary labels has a first value indicating the respective cyber incident is benign, or a second value indicating the respective incident is malicious, and the soft labels are indicative of suspiciousness levels of the cyber incidents. The processor is configured to generate a given cyber incident including an alert corresponding to one or more suspicious behavioral activities in a computer system, to assign a risk score to the given cyber incident using the trained machine learning model, and to initiate a responsive action responsively to the risk score.

There is additionally provided, in accordance with an embodiment that is described herein, a computer software product, including a non-transitory computer-readable medium in which program instructions are stored, which instructions, when read by a computer, cause the computer to receive a corpus of cyber incidents, each cyber incident including (i) one or more alerts indicative of suspicious activities in one or more computer systems, and (ii) one or more features characterizing the cyber incident, to further receive binary labels respectively assigned to the cyber incidents of the corpus, each of the binary labels having a first value indicating the respective cyber incident is benign, or a second value indicating the respective cyber incident is malicious, to hold one or more predefined labeling rules that map the binary labels to respective soft labels that are indicative of suspiciousness levels of the cyber incidents, to map the binary labels to respective soft labels, based at least on the predefined labeling rules, and to provide the cyber incidents of the corpus and the respective soft labels for training a machine learning model that, when trained, predicts risk scores for cyber incidents outside the corpus.

These and other embodiments will be more fully understood from the following detailed description of the embodiments thereof, taken together with the drawings in which:

DETAILED DESCRIPTION OF EMBODIMENTS

Overview

Figure 1:
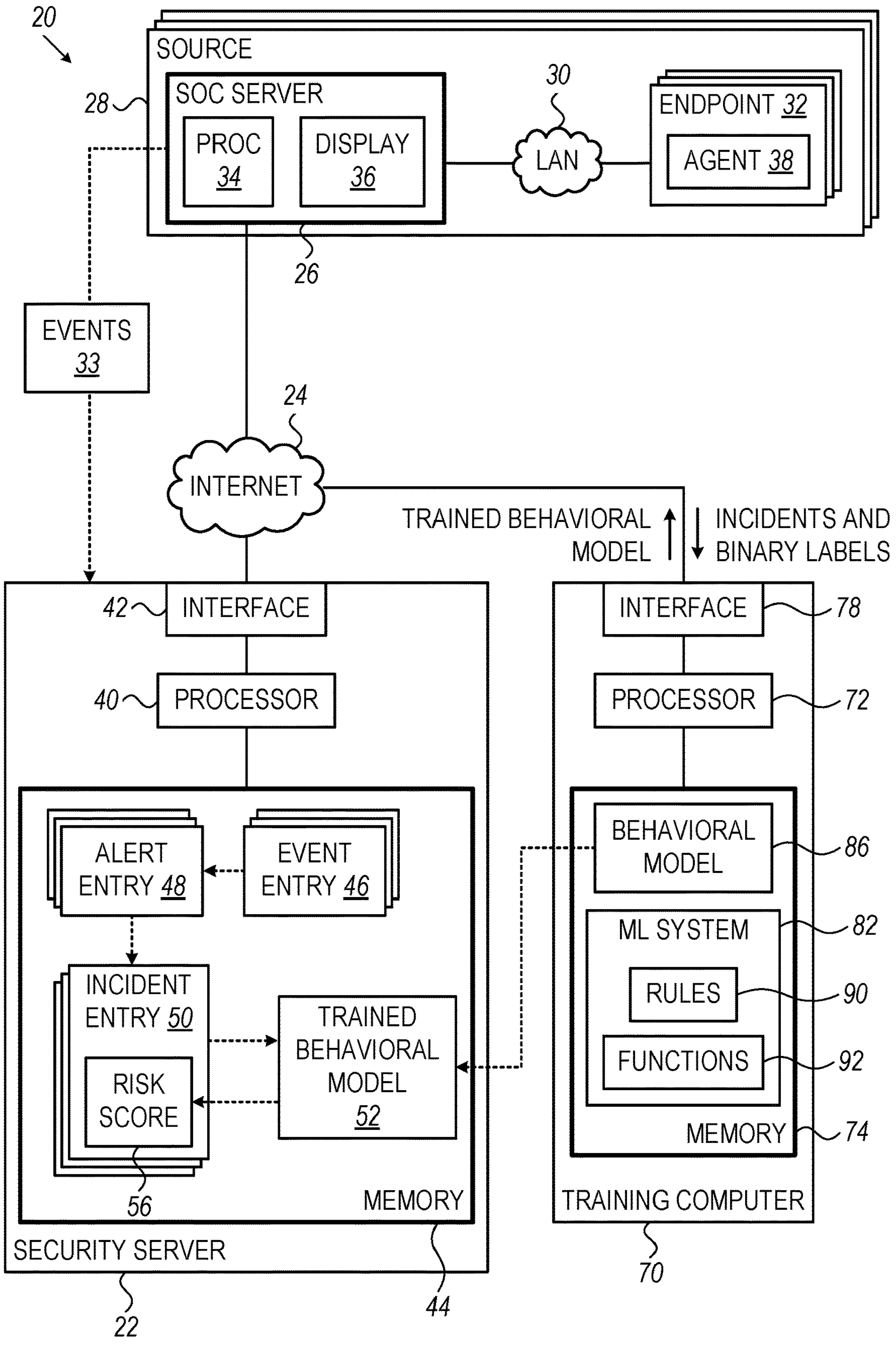
FIG. 1 is a block diagram that schematically illustrates a cyber protected computer system, in accordance with an embodiment that is described herein.

In various organizations a security operations center (SOC) is used for handling the visualization, analysis and responding to cybersecurity threats. SOCs can be flooded with huge daily volumes of cybersecurity alerts that indicate suspicious cybersecurity activities.

The analysis of an incident by the SOC's analysts is typically a complex task that may take hours. In some instances, the number of daily incidents (e.g., 100) can exceed the SOC's handling capacity (e.g., 15 incidents per day). Consequently, incidents reported to the SOC are typically prioritized so that an analyst can give attention to higher prioritized incidents, first. One way to prioritize an incident is to apply to the incident a previously trained model that assigns to the incident a score such as a risk score.

Embodiments that are described herein provide methods and systems for training a prioritization model that serves for rating cybersecurity incidents in terms of their priorities. The disclosed embodiments focus mainly on training a model for rating cyber incidents related to user and entity behavior. A model of this sort is also referred to herein as a "behavioral model".

Supervised training is typically performed based on a corpus of example incidents and respective labels preassigned to the incidents, e.g., by the customer. The trained model can then be used for prioritization of incidents outside the corpus. Commonly, the customer assigns to the incidents binary labels indicating each incident being malicious or benign. Conventionally, binary labels are assigned even to incidents that are related to user and entity behavior. Since behavior-related activities are typically not sharply classified as malicious or benign, a model related to user and entity behavior, but trained using binary labels, is expected to rate the priorities of behavior-related incidents inaccurately.

In the disclosed embodiments, behavior related incidents and respective binary labels are provided for training a behavioral model. The binary labels are mapped to soft labels, e.g., in a subrange between benign and malicious, and the model is trained using the incidents and the soft labels.

Consider a method for cybersecurity, the method comprising, receiving a corpus of cyber incidents, each cyber incident comprising (i) one or more alerts indicative of suspicious activities in one or more computer systems, and (ii) one or more features characterizing the cyber incident, and further receiving binary labels respectively assigned to the cyber incidents of the corpus, each of the binary labels having a first value (e. g., 0) indicating the respective cyber incident is benign, or a second value (e.g., 1) indicating the respective cyber incident is malicious. One or more predefined labeling rules are held, that map the binary labels to respective soft labels that are indicative of suspiciousness levels of the cyber incidents. The binary labels are mapped to respective soft labels, based at least on the predefined labeling rules. The cyber incidents of the corpus and the respective soft labels are provided for training a machine learning model that, when trained, predicts risk scores for cyber incidents outside the corpus.

The disclosed embodiments mainly focus on suspicious behavioral activities of users and entities occurring in the computer systems.

In some embodiments, mapping the binary labels to soft labels is carried out in consecutive steps as follows. In a rough labeling step, binary labels are mapped to soft labels using the predefined labeling rules. In a following fine-tuning step, soft labels corresponding to the customer's verdicts Benign and Malicious are adjusted using predefined functions to further spread the values of the soft labels. Next, in a bounding step, the soft labels are bounded to a predefined range.

Further consider another method for cybersecurity, the method comprising holding a machine learning model that was trained based on soft labels derived from binary labels assigned to respective cyber incidents, wherein each of the binary labels has a first value indicating the respective cyber incident is benign, or a second value indicating the respective incident is malicious, and wherein the soft labels are indicative of suspiciousness levels of the cyber incidents. A given cyber incident is generated, the cyber incident comprising an alert corresponding to one or more suspicious behavioral activities in a computer system. A risk score is assigned to the given cyber incident using the trained machine learning model. A responsive action is initiated responsively to the risk score.

In the disclosed techniques, behavior related incidents and corresponding binary labels are provided for training a behavioral model. For accurate training, the binary labels are translated into soft labels indicative of suspiciousness levels other than sharp malicious or benign. The translation of the binary labels into the soft labels is based on side information such as predefined labeling rules and fine-tuning functions. By training based on the soft labels, the resulting behavioral model is much more accurate than a model that would have been trained based on the original binary labels.

System Description

FIG. 1 is a block diagram that schematically illustrates a cyber protected computer system 20, in accordance with an embodiment that is described herein.

In the configuration shown in FIG. 1, a security server 22 is configured to communicate, via a public data network 24 such as the Internet, with a plurality of security operations center (SOC) servers 26 located at a plurality of sources 28. SOC server 26 comprises a SOC processor 34 and an SOC display (e.g., an L.E.D. monitor) 36.

In some embodiments, each source 28 comprises an organization (e.g., a company) that has a respective local data network 30 over which SOC server 26 communicates with a plurality of network endpoints 32 such as hosts (e.g., computer workstations, laptops and tablets), routers, firewalls and other network equipment. In these embodiments, each SOC server 26 on a given data network 30 can be configured to collect from the endpoints on the given network and from the given network, events 33 that are indicative of activities in the sources, and convey the collected events to security server 20, via Internet 24. The description that follows focuses mainly on events 33 that are related to behavioral activities. Event 33 typically comprises one or more behavioral activities on a given host or network element. Behavioral activities may be carried out by users and/or entities.

In addition, SOC server 26 typically collects, from the endpoints, alerts and incidents of non-behavioral nature (omitted from the figure for the sake of clarity) and sends the collected alerts and incidents to security server 20 via Internet 24. The SOC may collect the events, alerts and incidents, by collecting raw logs (not shown) on endpoint agents 38 (e.g., Cortex XDR™ produced by Palo Alto Networks, Inc., of 3000 Tannery Way, Santa Clara, CA 95054 USA) that execute on the endpoints. In additional embodiments, the collected alerts and incidents may be anonymized.

In addition to non-behavioral alerts and incidents raised by the sources, alerts and incidents related to user and entity behavioral activities are raised within security server 22, in an embodiment. An alert (behavioral or not) typically comprises a combination of one or more activities on a given host, that have a potential to represent malicious or suspicious activity. An incident (behavioral or not) typically comprises a group of one or more alerts that are related to the same malicious activity in one or more of the hosts.

In the description that follows, events, alerts and incidents related to behavioral activities are also referred to as "behavioral events", "behavioral alerts", and "behavioral incidents", respectively.

Security server 20 may comprise a server processor 40, an interface 42, and a memory 44. Interface 42 may be used for connecting to Internet 24, and for Input/Output of any other suitable data not via the Internet. In memory 44, behavioral events 33 are stored in event entries 46. Alerts derived from the behavioral events or received from the sources are stored in alert entries 48, and incidents grouped from alerts within the security server or received from the sources are stored in incident entries 50. In the description that follows the term "alert entry 48" is also referred to as "alert 48". Similarly, the term "incident entry 50" is also referred to as "incident 50".

In embodiments described herein, security server 20 comprises, in memory 44, a trained behavioral model 52. Typically, the security server comprises one or more additional trained models for other types of data. These other models are omitted from the figure for clarity. Behavioral model 52 is configured to compute incident scores such as risk scores 56 to prioritize handling of incidents 50, thereby enabling SOC analysts at sources 28 to efficiently handle the incidents.

In the example of FIG. 1, computer system 20 further comprises a training computer 70, comprising a processor 72, a memory 74 and an interface 78. Processor 72 receives for training, via interface 78, a corpus of incidents in which the alerts are indicative of suspicious behavioral activities, and corresponding binary labels assigned to the incidents in the corpus. A machine learning (ML) system 82 maps the binary labels to soft labels, and then trains a behavioral model 86 based on the incidents and on the soft labels. When trained, behavioral model 86 is provisioned into trained model 52 of the security server. In some embodiments, ML system 82 comprises predefined labeling rules 90 and functions 92, which are used in the mapping of the binary labels to the soft labels. A method for implementing such a mapping is described with reference to FIG. 4 below.

In some embodiments, interface 78 serves for receiving the incidents and binary labels, and for outputting the trained model 86. In the example of FIG. 1, interface 78 connects to Internet 24. Alternatively or additionally, interface 78 may receive the incidents and the binary labels, and/or output the trained model, in any other suitable way other than via Internet 24.

In the example configuration of FIG. 1, the behavioral model 86 is trained offline on training computer 70, externally to security server 22. This configuration is, however, not mandatory, and in alternative embodiments the behavioral model can be trained by processor 40 of the security server, or split among multiple processors, e.g., between computer 70 and the security server, for example.

The configuration of computer system 20, security server 22, SOC server 26, and training computer 70 are given by way of example, and other suitable computer system, SOC server, security server, and training computer configurations can also be used. Processors 34, 40, and 72 comprise general-purpose central processing units (CPUs) or special-purpose embedded processors, which are programmed in software or firmware to carry out the functions described herein. This software may be downloaded to security server 22, SOC server(s) 26, or training computer 70 in electronic form, over a network, for example. Additionally or alternatively, the software may be stored on tangible, non-transitory computer-readable media, such as optical, magnetic, or electronic memory media. Further additionally or alternatively, at least some of the functions of processors 34, 40, and 72 may be carried out by hard-wired or programmable digital logic circuits.

Examples of memories 44 and 74 include dynamic random-access memories, non-volatile random-access memories, hard disk drives and solid-state disk drives.

In some embodiments, tasks described herein performed by security server 22, SOC server 26, endpoints 32, and training computer 70 may be split among multiple physical and/or virtual computing devices. In other embodiments, these tasks may be performed in a data cloud.

Data Structures of Event, Alert and Incident Entries

Figure 2A:
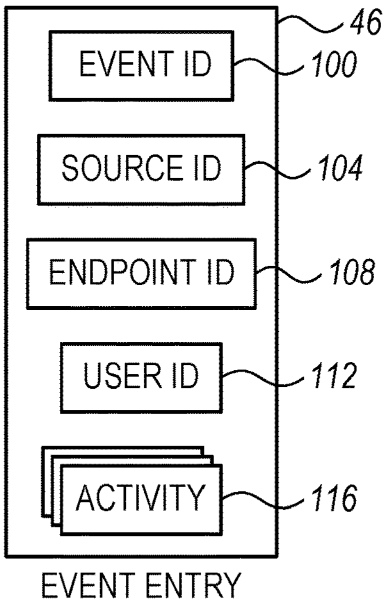
FIGS. 2A-2C are block diagrams that schematically illustrate examples of data components stored in event entries, alert entries and incident entries, in accordance with embodiments that are described herein.
Figure 2B:
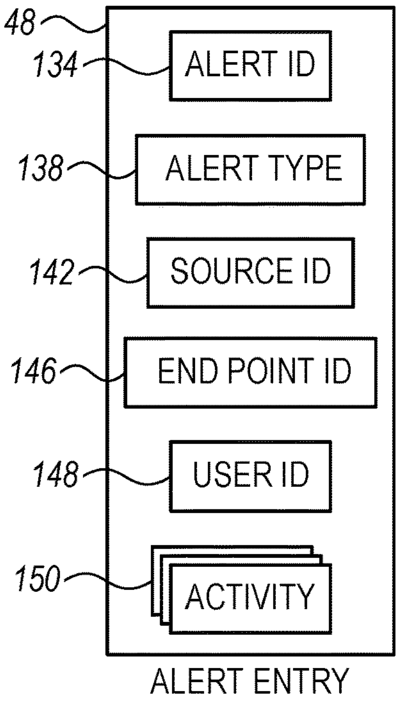
Figure 2C:
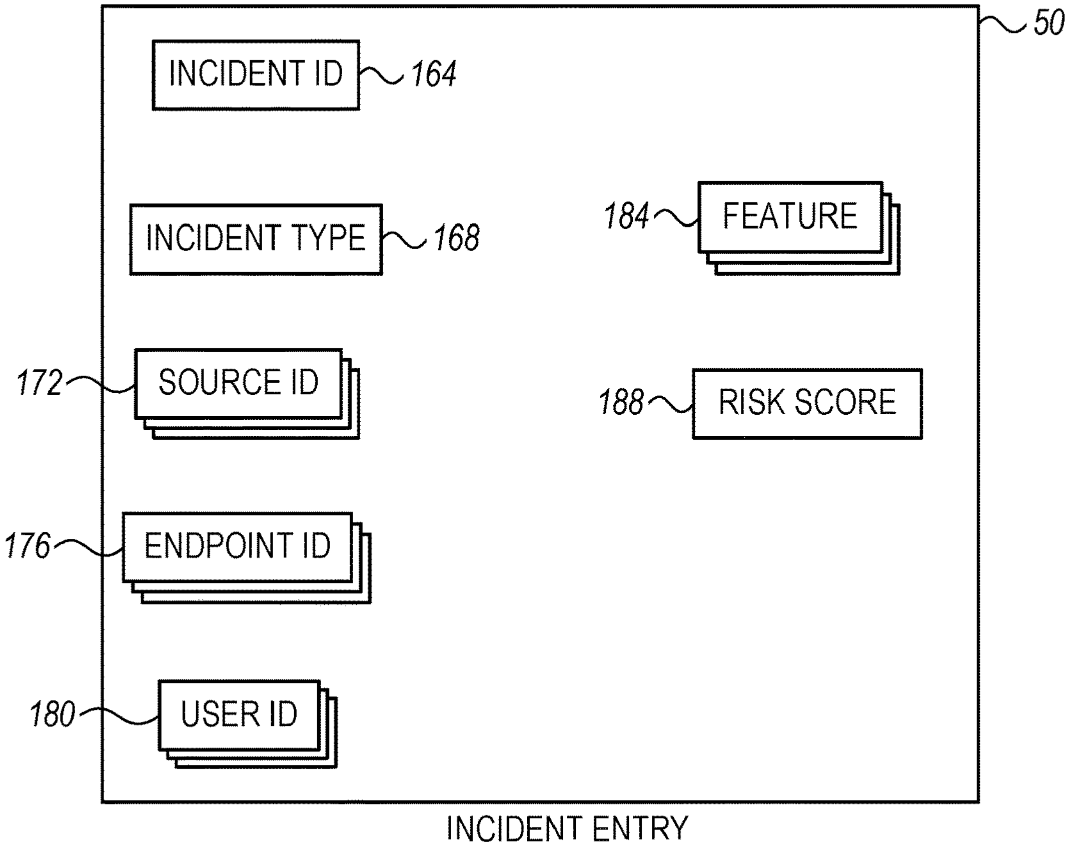

FIGS. 2A-2C are block diagrams that schematically illustrate examples of data components stored in event entries 46, alert entries 48 and incident entries 50, in accordance with embodiments that are described herein.

In some embodiments, processor 40 can store the following information to each given event entry 46 for a corresponding event 33:

- A unique event ID 100.
- A source ID 104 that references a given source 28 that is involved in identifying activities carried out by this source.
- An endpoint ID 108 that references, on the data network of the organization referenced by source ID 104, a given endpoint 32 that is involved in identifying activities carried by this endpoint. In some embodiments, the endpoint ID may comprise the media access control (MAC) address of the given endpoint.
- A user ID, 112 that references, on the data network of the organization referenced by source ID 104, a given user (not shown) accessing and operating the given endpoint.
- One or more activities 116, that describe actions carried within the source referenced by source ID 104, including actions taken by a user referenced by user ID 112.

In some embodiments, processor 40 can store the following information to each given alert entry 48 for a corresponding alert:

- A unique alert ID 134.
- An alert type 138 that describes the corresponding alert. In some embodiments, a given alert type can indicate a source for the corresponding alert. In these embodiments, examples of alert types 138 (i.e., sources) may include a firewall, an agent using first party predefined logic, a customer ID (e.g., source ID 142, as described hereinbelow), and a third-party vendor.
- A source ID 142 that references a given source 28 that generated the corresponding alert, or that is otherwise involved in generating the corresponding alert (e.g., in case of a behavioral alert).
- An endpoint ID 146 that references, on the data network of the organization referenced by source ID 142, a given endpoint 32 that caused or generated the corresponding alert, or that is involved in generating the corresponding alert (e.g., in case of a behavioral alert). In some embodiments, the endpoint ID may comprise the media access control (MAC) address of the given endpoint.
- A user ID 148 that references, on the data network of the organization referenced by source ID 142, a given user (not shown) accessing and operating the given endpoint that caused or generated the corresponding alert, or that is involved in generating the corresponding alert (e.g., in case of a behavioral alert).
- One or more activities 150 that describe one or more cyber events that caused the corresponding alert and any other endpoints (i.e., on the data network of the organization referenced by source ID (142) that participated in the cyber events.

In some embodiments, processor 40 can store the following information to each given incident entry 50 for a corresponding incident:

- A unique incident ID 164.
- An incident type 168 that describes the corresponding incident. Similarly to alert types 138, the incident type for a given incident 50 can indicate a source for the given incident. For example, a given incident type 50 may comprise a customer ID (e.g., source ID 172, as described hereinbelow), or a third-party vendor ID.
- One or more source IDs 172 corresponding to the one or more sources 28 that generated, or were involved in generating, the one or more alerts in the corresponding incident. For example, one or more endpoints 32 may (attempt to) contact the same command-and-control (C&C) server.
- One or more endpoint IDs 176 that reference, on the data network of the organization referenced by source ID 172, one or more respective endpoints 32 that caused or generated (or were involved in the generation of) the corresponding incident (or the one or more alerts in the corresponding incident).

In some embodiments, the endpoint ID may comprise the media access control (MAC) address of the given endpoint.

- One or more user IDs 180 that reference, on the data network of the organization referenced by source ID 172, one or more users (if applicable) operating the one or more endpoints that caused or generated (or that were involved in the generation of) the corresponding incident (or the one or more alerts in the corresponding incident).
  - A set of features 184 that endpoints referenced by endpoint IDs 176 and/or processor 40 can compute (or extract) from the alerts in the corresponding incident. Some features are derived based on statistical information dynamically collected on behavioral activities and alerts. Such statistical information may include, for example, the prevalence of an alert or alert combination within some period. The features of an incident may be updated on a regular basis (e.g., daily), for example, in response to grouping a new alert to the incident.
  - A risk score, that processor 40 can assign to the corresponding incident using a trained model such as trained behavioral model 52. In embodiments described herein, upon applying a given model (e.g., 52) to a given incident, the given model generates a given risk score (i.e., a predicted label) indicating a suspected maliciousness of the given incident. Details of behavioral model 52 are described hereinbelow.

Methods for Training a Behavioral Model by Assigning Soft Labels to Incidents

As noted above, a behavioral incident comprises one or more related alerts that are indicative of suspicious behavioral activities of one or more users and/or entities in a customer (source).

Suspicious behavioral activities in organizations can be detected using advanced cyber tools such as the User Entity Behavior Analytics (UEBA) and the Identity Threat Detection and Response (ITDR) tools. UEBA uses advanced analytics to detect user and entity behavior anomalies within an organization's network. ITDR involves the detection and response to potential identity-based threats, such as, for example, compromised user accounts, leaked passwords, data breaches, and fraudulent activity. UEBA and ITDR may also detect attacks caused by malicious insiders who abuse their authorized access to conduct fraudulent or illegal activities.

Suspicious user activities may include, for example, a user connecting for the first time (e.g., during the last month) from another country, a user working in unusual hours, and a user failing to connect to his account several times. Suspicious entity activities may occur, for example, when an attacker attempts breaking into an important machine in the organization using multiple users concurrently. In this case the machine is the asset involved rather than the user.

As noted above, incidents reported to SOCs are prioritized using risk scores. In some embodiments, a risk score may be indicative of the severity of the activities in the incident and the damaging potential to the customer. A risk score may also indicate the level of interest for the SOC analyst, or a priority measure for handling the incident.

An incident that is clearly indicative of a malicious activity that requires urgent attention such as a virus detected in a computer, is considered a "malicious incident". An incident that is clearly indicative of harmless activities can be ignored and is considered a "benign incident".

An incident indicative of an activity of moderate severity should be rated between benign and malicious. An example of such incidents are behavioral incidents. For example, a user connecting to the organization from a foreign country or at unusual hours may be a legitimate activity, but to some degree may indicate a potential malicious operation that may be handled with low priority.

Incidents may be prioritized with risk scores, for example, using a machine learning model, such as behavioral model 52 of security server 22. The machine learning model is trained based on example behavioral incidents and associated labels assigned to these incidents, and then used for predicting risk scores for other incidents, e.g., created in a live system. The incidents used for training are typically carefully analyzed, (e.g., by SOC analysts) and are each assigned a desirable or expected binary label having a value "Malicious" or "Benign". As explained above, training a behavioral model using behavioral incidents that are labeled with binary labels typically results in an inaccurate model. To improve the training, the binary labels may be mapped to soft labels, e.g., in a range between Malicious and Benign, and then used for the training instead of the binary labels. As will be described below, mapping the binary labels to soft labels is based on side information such as predefined labeling rules (90) and functions (92).

Figure 3:
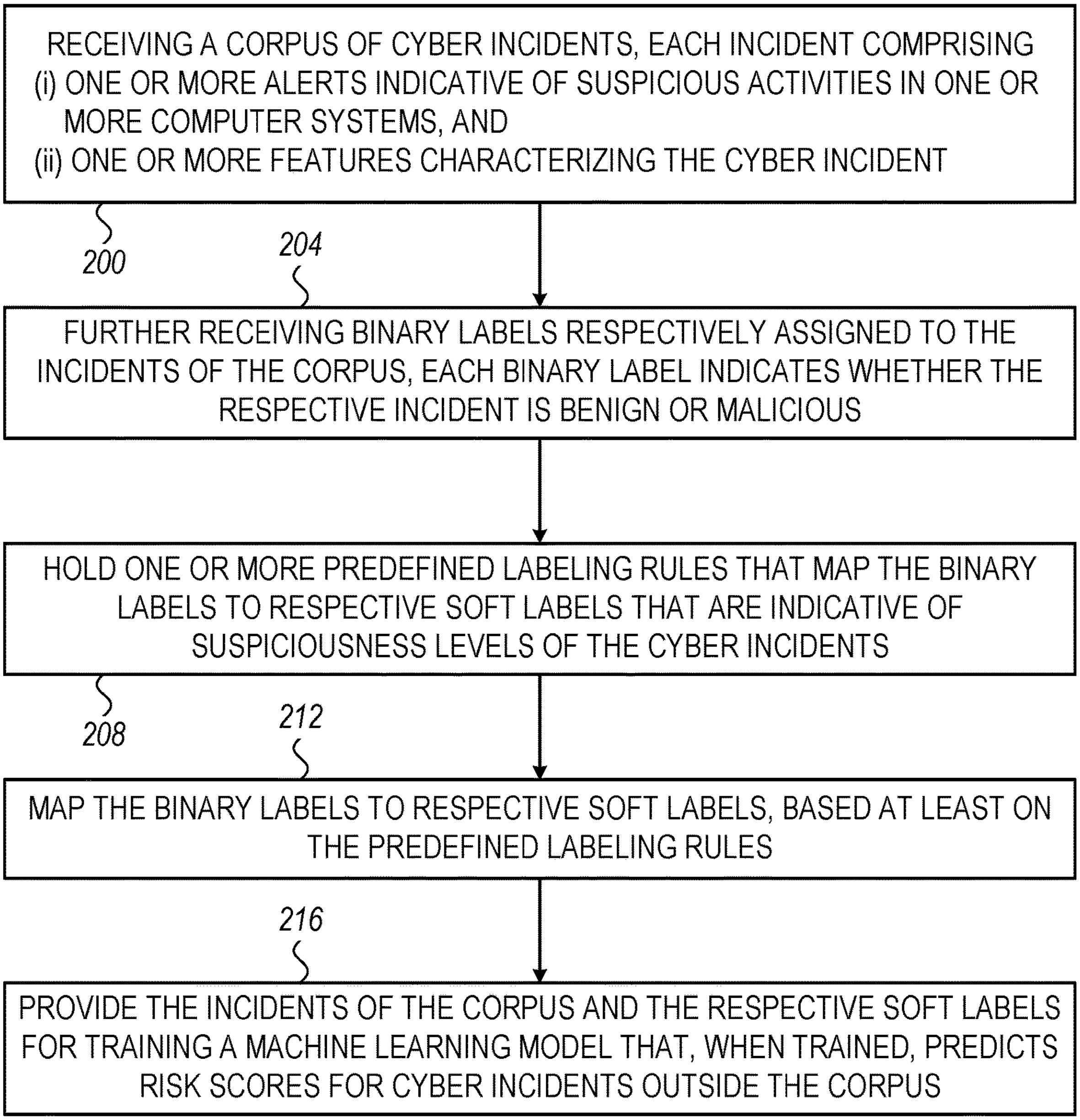
FIG. 3 is a flow chart that schematically illustrates a method for training a model by assigning soft labels to incidents on which the model trains, in accordance with an embodiment that is described herein.

FIG. 3 is a flow chart that schematically illustrates a method for training a model by assigning soft labels to incidents on which the model trains, in accordance with an embodiment that is described herein.

The method will be described as executed by processor 72 of training computer 70.

The method begins at an incident reception step 200, with processor 72 receiving a corpus of cyber incidents, each of which comprising (i) one or more alerts indicative of suspicious activities in one or more computer systems, and (ii) one or more features characterizing the cyber incident. The received incidents are typically stored in memory 74 (not shown). In the present example, the incidents comprise behavioral incidents to be used for training a behavioral model.

At a label reception step 204, processor 72 further receives binary labels respectively assigned to the incidents of the corpus, e.g., by the customer(s). In an embodiment, each of the binary labels indicates whether the respective incident is benign or malicious. The received binary labels are typically stored in memory 74 (not shown).

At a rule holding step 208, processor 72 holds one or more predefined labeling rules 90 that ML system 82 uses for mapping the binary labels to respective soft labels that are indicative of suspiciousness levels of the cyber incidents (e.g., in a range between the Benign and Malicious values). The soft labels get "soft" suspiciousness values, i.e., excluding definite malicious and benign values.

At a mapping step 212, processor 72 maps the binary labels of the incidents in the corpus to respective soft labels, based at least on the predefined labeling rules. A labeling rule 90 may map the binary label associated with the incident in question to a predefined soft label, when the incident has one or more features 184 associated with that rule.

At an output step 216, processor 72 provides the incidents of the corpus and the respective soft labels for training a machine learning model that, when trained, predicts risk scores for cyber incidents outside the corpus. In an example embodiment, processor 72 provides the incidents and soft labels to ML system 82 for producing behavioral model 86.

Mapping Binary Labels to Soft Labels Based on Side Information

Figure 4:
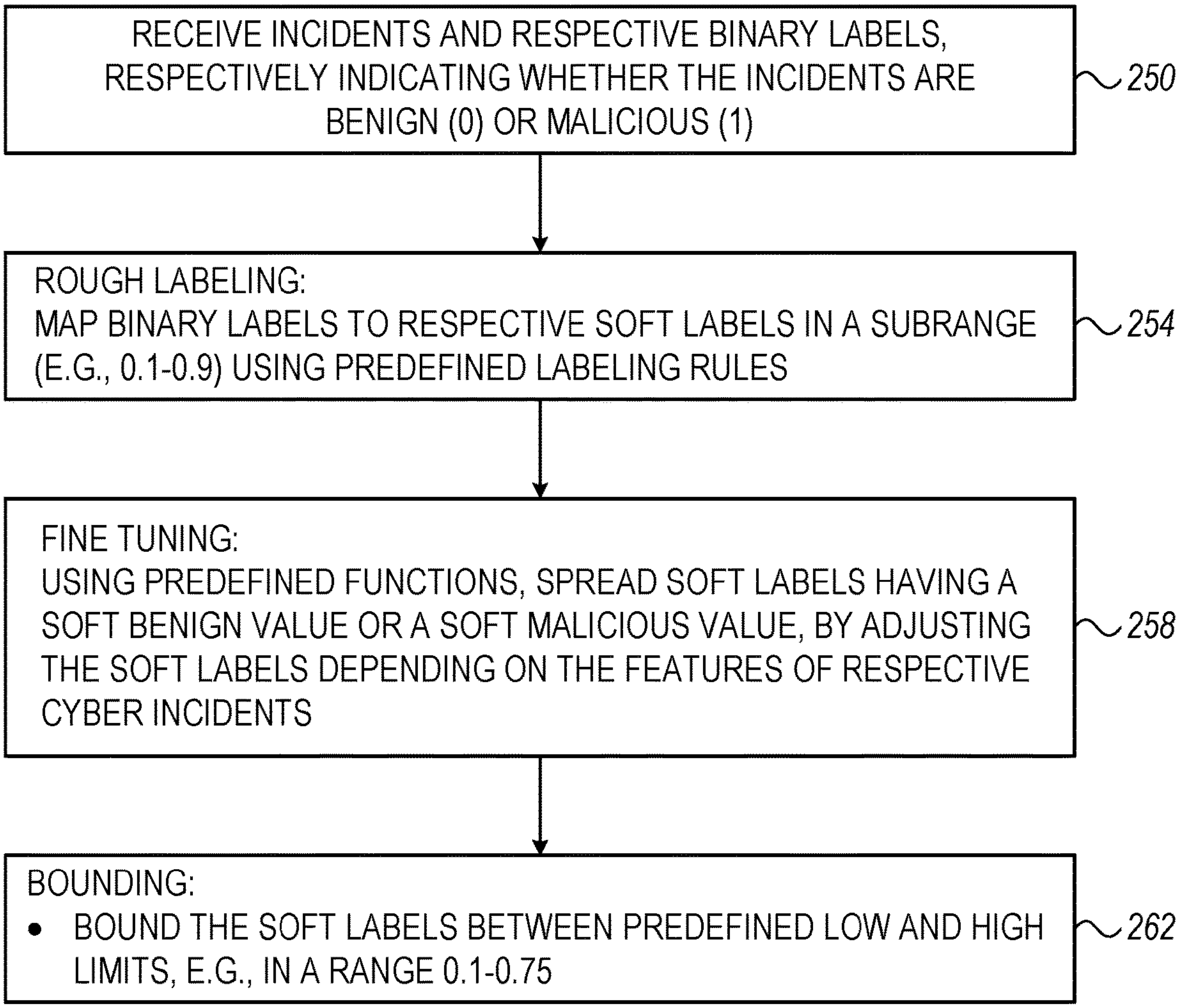
FIG. 4 is a flow chart that schematically illustrates a method for mapping binary labels to soft labels, in accordance with an embodiment that is described herein.

FIG. 4 is a flow chart that schematically illustrates a method for mapping binary labels to soft labels, in accordance with an embodiment that is described herein.

FIGS. 5A-5D are diagrams that schematically illustrate example distributions of labels while mapping binary labels to soft labels using the method of FIG. 4, in accordance with embodiments that are described herein.

The disclosed mapping method relies on side information in the form of predefined labeling rules (90) and fine-tuning functions (92), as described below.

The method of FIG. 4 will be described as executed by processor 72 of training computer 70, e.g., in implementing step 212 of the method of FIG. 3 above. Moreover, in describing the method of FIG. 4, example label distributions depicted in FIGS. 5A-5D will be referenced as required. In FIGS. 5A-5D, the horizontal axis denotes label values, whereas the vertical axis denotes the number of labels (or incidents) having each label value.

Figure 5A:
FIGS. 5A-5D are diagrams that schematically illustrate example distributions of labels while mapping binary labels to soft labels using the method of FIG. 4, in accordance with embodiments that are described herein.

The method of FIG. 4 begins at a binary label reception step 250, with processor 72 receiving for training cyber incidents and respective binary labels preassigned to the incidents. The incidents comprise alerts corresponding to suspicious behavioral activities in the computer systems in which the incidents were captured. Step 250 may be implemented using steps 200 and 204 of the method of FIG. 3 above. FIG. 5A depicts an example distribution of the received binary labels. As depicted in the figure, the number of binary labels associated with benign incidents is typically much larger than the number of the binary labels associated with malicious incidents.

In the present example, binary labels of benign incidents have a numerical value '0' and binary labels of malicious incidents have a numerical value '1'. As will be described below, with this scale, the soft labels get values in a partial subrange of the range 0-1. In alternative embodiments, the binary labels may have numerical values other than 0 and 1 (e.g., 0 and 100). Moreover, the soft labels may get values in any suitable range, not necessarily related to the numerical values of the binary labels. The soft labels, however, do not get values corresponding to a definite Benign or Malicious value.

At a rough labeling step 254, processor 72 initially maps the received binary labels (Benign and Malicious) to a range of soft labels between a minimal soft value (0.1 in the present example) and a maximal soft value (0.9 in the present example).

Processor 72 typically maps binary labels of incidents labeled as Benign to soft labels having a value denoted "soft Benign" (e.g., 0.1), and maps binary labels of incidents labeled as malicious to soft labels having a value denoted "soft Malicious" (e.g., 0.6), and above. The soft Benign value thus corresponds to the customer's Benign verdict and the soft Malicious value corresponds to the customer's Malicious verdict.

In the rough labeling step, soft labels having values above the soft Malicious value (e.g., in the range 0.7-0.9) typically correspond to binary labels that are mapped using predefined deterministic labeling rules 90. A labeling rule that is associated with one or more features of a given incident may be used for mapping the input binary label of this incident to a soft label value that has been determined offline, e.g., by cyber analysts who carefully investigated the properties, distributions and cyber-context of the features of that incident. Features that are usable for the labeling rules specify or are indicative of, for example, the existence of a rare and/or high severity alert in the incident, the existence of a rare alert combination in the incident, and having multiple alerts associated with the same user in the incident. In the present context the term "rare" means that the number of occurrences (e.g., of an alert or alert combination) within a given period of time is smaller than a specified threshold number.

Figure 5B:
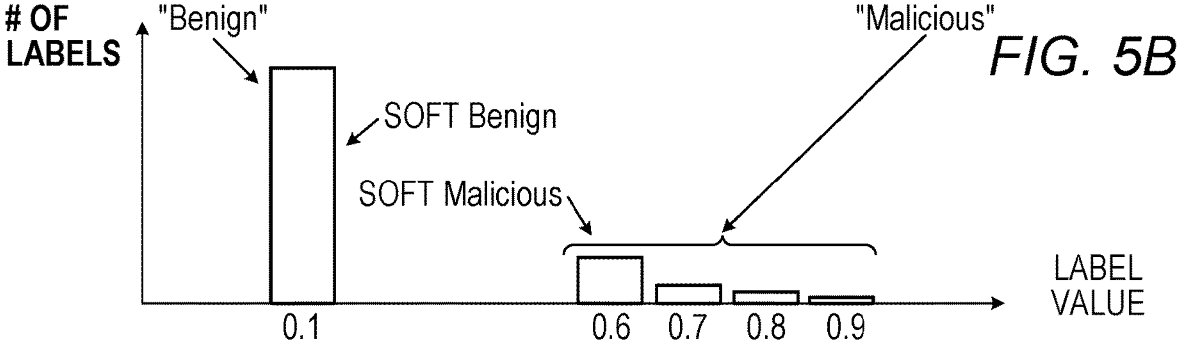

In some embodiments, processor 72 first maps binary labels of incidents having features associated with the labeling rules, to soft labels having values above the soft Malicious value. Processor 72 then assigns the soft Benign value (e.g., 0.1) to the remaining incidents labeled as Benign, and assigns the soft Malicious value (e.g., 0.6) to the remaining incidents labeled as Malicious. FIG. 5B depicts an example distribution of the soft labels resulting by the rough labeling step, at 0.1 soft label resolution.

At a fine-tuning step 258, processor 72 uses one or more predefined functions 92 to spread values of soft labels having the soft Benign value (0.1 in this example) and the soft Malicious value (0.6 in this example), along the axis range 0-1. The predefined functions are typically determined offline and held in memory 74 of training computer 70.

In some embodiments, processor 72 adjusts the value of a soft label (having the soft Benign or soft Malicious value) by applying a predefined function 92 to the soft label value, depending on a numerical value of a feature of the cyber incident, the feature is associated with that function. In some embodiments, a given function 92 is applied for fine tuning the soft label, when this given function has a corresponding feature (or features) in the incident in question. The numerical value of the feature may be indicative, for example, of prevalence and/or accuracy of an alert or alert combination in the incident, as described hereinbelow.

Other example relevant features with which functions 92 may be associate may be indicative of the prevalence of a host being involved in suspicious behavioral activities, or the prevalence of a suspicious external IP address from which one or more users attempt to connect to the organization network from a foreign country. Moreover, prevalence can further correspond to local statistics (e.g., evaluated per tenant or customer) and global statistics (e.g., evaluated over some or all customers). The prevalence may also be evaluated in terms of the number of incidents and agents.

The prevalence measure indicates how rare is the alert, e.g., depending on the number of times the alert was triggered in the last month (or any other suitable period) in a given source (or multiple sources). For defining the accuracy measure, let "nM" denote the number of occurrences (e.g., number of alerts) associated with Malicious activities occurring within a specified period, and let "nB" denote the number of occurrences associated with Benign activities occurring within the same period. The accuracy measure may be evaluated as given by: nM/(nM+nB).

In general, a rare alert is more significant in terms of cybersecurity than a prevalent alert (and therefore the incident having a rare alert should get a higher soft label value than an incident having a prevalent alert). Similarly, an accurate alert is more significant in terms of cybersecurity than a less accurate alert (and therefore the incident should get a higher soft label value when having the accurate alert).

As noted above, the prevalence measure may indicate the number of times the alert (or alert combination) has been triggered during a recent period, e.g., during the last month. When the alert is highly prevalent and/or highly inaccurate, the tuning function decreases the soft label value. In contrast, if the alert is rare and/or highly accurate, the fine-tuning function increases the value of the soft label.

For example, let "SV" denote the non-adjusted value of the soft label, and let "PREV" denote the prevalence of a given alert. Then, the fine-tuning function 'F' may be given by: F(SV, PREV)=SV+(1−PREV)/10. In this example, if the alert was rarely triggered during, e.g., the last month (e.g., PREV=0), the function increases SV by 0.1. Alternatively, when the alert is not commonly triggered during the last month (e.g., PREV=1), the function does not change SV. Further alternatively, when the alert is commonly triggered during the last month (e.g., PREV=2), the function F decreases SV by 0.1. In the example above, the function F comprises a linear function (of the soft label and prevalence values, in this example). This, however, is not mandatory, and in alternative embodiments, a nonlinear function of the soft label and the numerical feature value can also be used. In some embodiments, the numerical feature value is determined by binning feature values to multiple discrete values in a range suitable for input to the function F.

In some embodiments, to check suspicious activities over time, alert and incident information is stored over a period of time such as a month, for example. This information is available in the incidents used for training the behavioral model.

In some embodiments, the predefined fine-tuning functions (92) of step 258 are associated with multiple features of the incident. In such embodiments, processor 72 may accumulatively adjust the soft label value multiple times using the same fine-tuning function and multiple numerical values of the respective features. Alternatively, multiple different functions 90 may be accumulatively applied depending on numerical values of multiple respective features.

Functions 92 can be designed offline to have different effects on different features, e.g., by determining the slopes of linear functions. This type of "feature importance engineering" also assists in improving explainability to the customer who may be interested in knowing how a certain risk score is determined based on the underlying features.

Figure 5C:
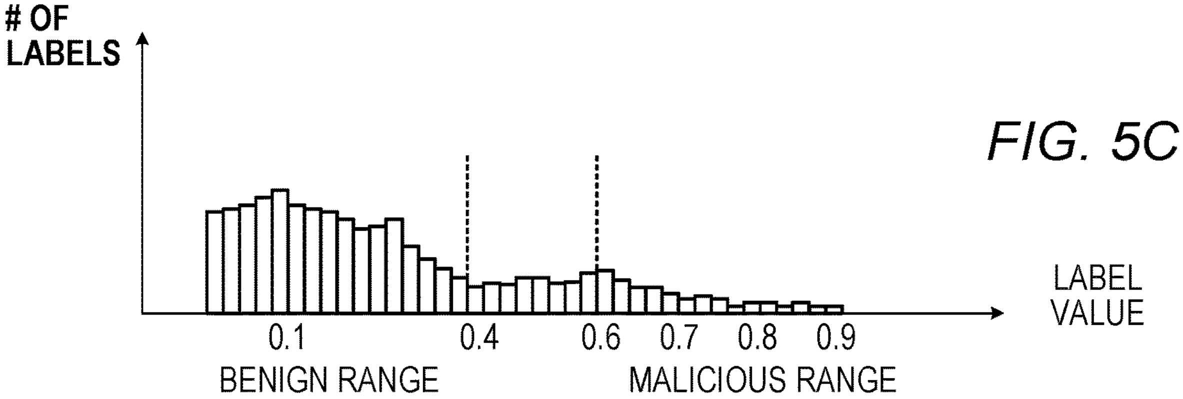

FIG. 5C depicts the distribution of the soft labels between 0 and 1, resulting by fine-tuning step 258 of FIG. 4. In this example, the resulting soft values are given at a resolution of 0.25 and are spread along the range 0-1. In some embodiments, the range below 0.4 may indicate a range of Benign verdicts, and the range above 0.6 may indicate a range of Malicious verdicts.

Figure 5D:
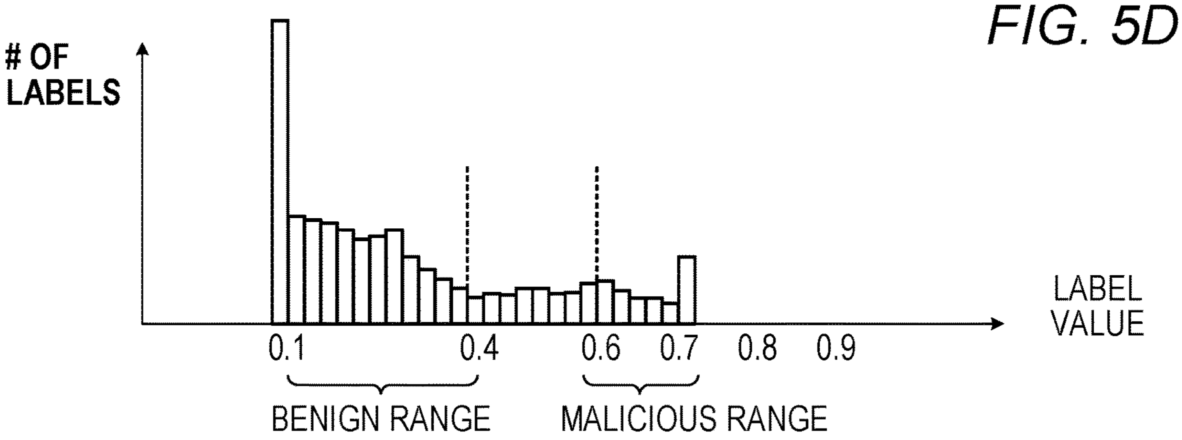

At a bounding step 262, processor 272 bounds the soft labels (resulting by the fine-tuning step) between predefined low and high limits. For example, the processor may bound the soft limits to a range 0.1-0.75, as depicted in FIG. 5D. Following step 262 the method terminates.

Figure 6:
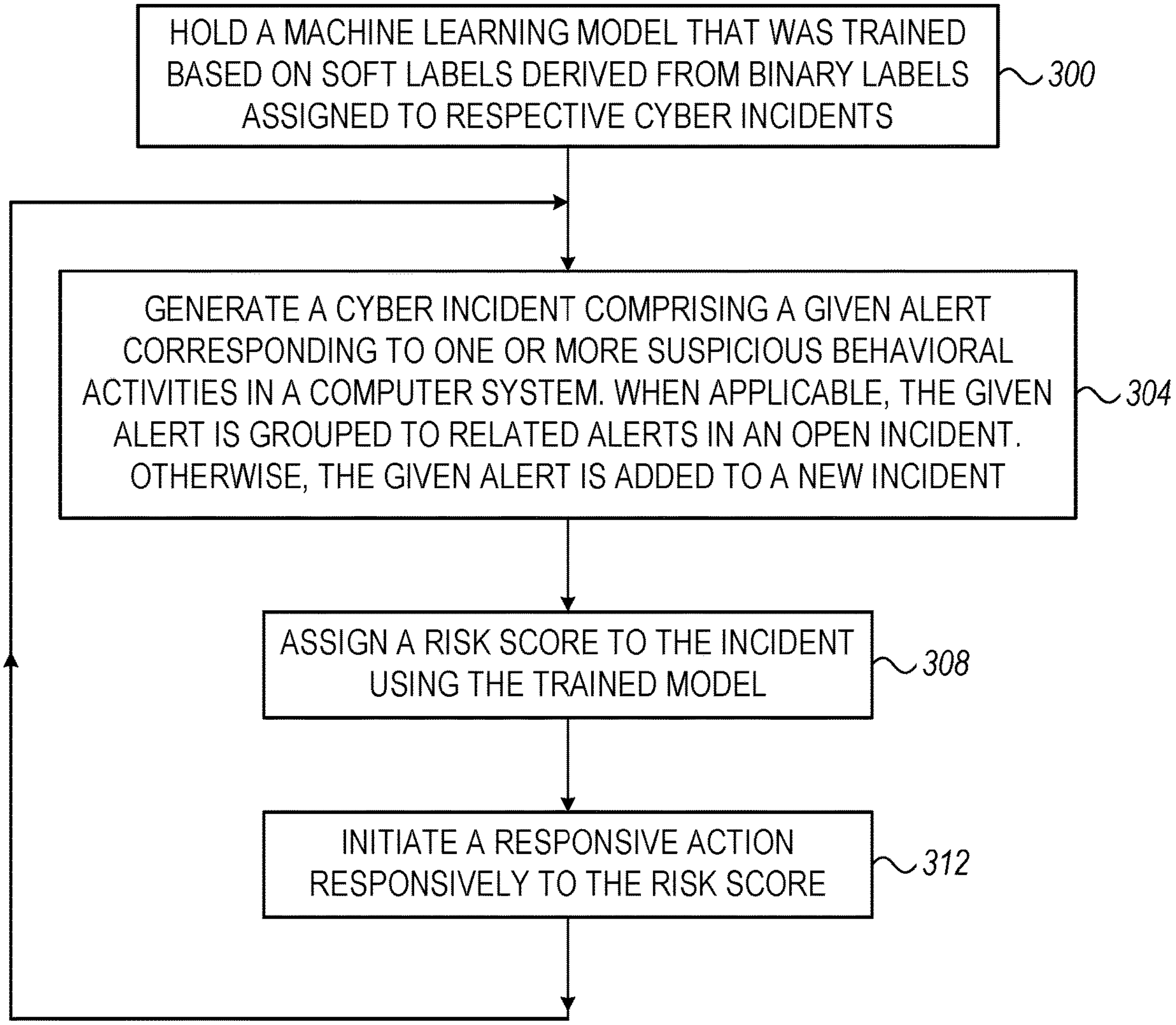
FIG. 6 is a flow chart that schematically illustrates a method for assigning risk scores to behavioral incidents using a behavioral model that was trained with soft labels, in accordance with an embodiment that is described herein.

A Security Server Assigning Risk Scores Using a Behavioral Model Trained with Soft Labels FIG. 6 is a flow chart that schematically illustrates a method for assigning risk scores to behavioral incidents using a behavioral model that was trained with soft labels, in accordance with an embodiment that is described herein.

The method will be described as executed by processor 40 of security server 40 of FIG. 1.

The method begins at a model holding step 300, with processor 40 holding a machine learning model that was trained based on soft labels derived from binary labels assigned to respective cyber incidents. In the present example, the model of step 300 comprises trained behavioral model 52 of the security server. The machine learning model may be trained, for example, using the methods described with reference to FIGS. 3 and 4 above. The training methods may be carried out, for example, by the security server, training computer 70, or split between the security server and the training computer, for example.

At an incident generation step 304, processor 40 generates a cyber incident comprising a given alert corresponding to one or more suspicious behavioral activities in a computer system (e.g., in a source 28 of computer server 20). In some embodiments, processor 40 generates the given alert based on one or more events (33) received from a source 28. In response to the given alert, processor 40 adds the given alert, when applicable, to update an open incident having one or more alerts whose suspicious behavioral activities are related to those of the given alert. Otherwise, processor 40 opens a new incident for the given alert.

At a prioritizing step 308, processor 40 assigns to the generated incident a risk score, by applying the trained behavioral model to the incident.

At a response application step 312, processor 40 initiates a responsive action responsively to the risk score. For example, processor 40 may notify the underlying incident and the respective soft score assigned using the behavioral model, to a relevant SOC in the computer system. In an embodiment, the SOC may present, on display 36, a notification (e.g., a warning message) comprising an ID, description, and the computed incident risk score.

Following step 312 processor 40 loops back to step 304 to generate (or update) another behavioral incident.

The embodiments described above are given by way of example, and other suitable embodiments can also be used.

Although the embodiments described herein mainly address the training of a behavioral model by assigning soft labels to incidents containing behavioral alerts, the methods and systems described herein can also be used in other applications, such as in training other types of models using soft labels, e.g., based on behavioral file-oriented alerts or behavioral analytical alerts. The disclosed embodiments are also applicable for training with soft labels an Endpoint Detection and Response (EDR) model that addresses "EDR alerts", which are enhanced by data from agents.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for cybersecurity, the method comprising:

receiving a corpus of cyber incidents, each cyber incident comprising (i) one or more alerts indicative of suspicious activities in one or more computer systems, and (ii) one or more features characterizing the cyber incident;

further receiving binary labels respectively assigned to the cyber incidents of the corpus, each of the binary labels having a first value indicating the respective cyber incident is benign, or a second value indicating the respective cyber incident is malicious;

holding one or more predefined labeling rules, each predefined labeling rule being associated with one or more features indicative of at least one of: (i) existence of a rare alert or a high severity alert in the cyber incident, (ii) existence of a rare alert combination in the cyber incident, or (iii) multiple alerts associated with a same user in the cyber incident, wherein the one or more predefined labeling rules map the binary labels to respective soft labels that are indicative of suspiciousness levels of the cyber incidents;

mapping the binary labels to respective soft labels, based at least on the predefined labeling rules; and providing the cyber incidents of the corpus and the respective soft labels for training a machine learning model that, when trained, predicts risk scores for cyber incidents outside the corpus.

2. The method according to claim 1, wherein the suspicious activities comprise suspicious behavioral activities of users and entities occurring in the computer systems.

3. The method according to claim 1, wherein mapping the binary labels comprises mapping, at least some of the binary labels having the first value to a soft first value, and mapping at least some of the binary values having the second value to a soft second value higher than the soft first value.

4. The method according to claim 3, wherein mapping the binary labels comprises mapping, using the predefined labeling rules, binary labels of cyber incidents having features corresponding to the predefined labeling rules, to respective soft labels having values higher than the soft second value.

5. The method according to claim 1, and comprising:

holding one or more functions, that when applied, modify the soft labels depending on the features of respective cyber incidents; and for a cyber incident having a feature corresponding to a given function among the one or more functions, adjusting the corresponding soft label by applying the given function to the soft label and to a numerical value of the feature.

6. The method according to claim 1, and comprising bounding the soft labels to values between predefined low and high limits.

7. The method according to claim 1, and comprising providing the trained model for assigning risk scores to incidents detected in a computer system.

8. An apparatus for cybersecurity, comprising:

an interface, configured to:

receive a corpus of cyber incidents, each cyber incident comprising (i) one or more alerts indicative of suspicious activities in one or more computer systems, and (ii) one or more features characterizing the cyber incident; and further receive binary labels respectively assigned to the cyber incidents of the corpus, each of the binary labels having a first value indicating the respective cyber incident is benign, or a second value indicating the respective cyber incident is malicious; and a processor, configured to:

hold one or more predefined labeling rules, each predefined labeling rule being associated with one or more features indicative of at least one of: (i) existence of a rare alert or a high severity alert in the cyber incident, (ii) existence of a rare alert combination in the cyber incident, or (iii) multiple alerts associated with a same user in the cyber incident, wherein the one or more predefined labeling rules map the binary labels to respective soft labels that are indicative of suspiciousness levels of the cyber incidents;

map the binary labels to respective soft labels, based at least on the predefined labeling rules; and provide the cyber incidents of the corpus and the respective soft labels for training a machine learning model that, when trained, predicts risk scores for cyber incidents outside the corpus.

9. The apparatus according to claim 8, wherein the suspicious activities comprise suspicious behavioral activities of users and entities occurring in the computer systems.

10. The apparatus according to claim 8, wherein the processor is configured to map the binary labels by mapping, at least some of the binary labels having the first value to a soft first value, and mapping at least some of the binary values having the second value to a soft second value higher than the soft first value.

11. The apparatus according to claim 10, wherein the processor is configured to map the binary labels by mapping, using the predefined labeling rules, binary labels of cyber incidents having features corresponding to the predefined labeling rules, to respective soft labels having values higher than the soft second value.

12. The apparatus according to claim 8, wherein the processor is further configured to:

hold one or more functions, that when applied, modify the soft labels depending on the features of respective cyber incidents; and for a cyber incident having a feature corresponding to a given function among the one or more functions, adjust the corresponding soft label by applying the given function to the soft label and to a numerical value of the feature.

13. The apparatus according to claim 8, wherein the processor is configured to bound the soft labels to values between predefined low and high limits.

14. The apparatus according to claim 8, wherein the processor is configured to provide the trained model for assigning risk scores to incidents detected in a computer system.

15. A method for cybersecurity, the method comprising:

holding a machine learning model that was trained based on soft labels derived from binary labels using one or more predefined labeling rules, each predefined labeling rule being associated with one or more features indicative of at least one of: (i) existence of a rare alert or a high severity alert in the cyber incident, (ii) existence of a rare alert combination in the cyber incident, or (iii) multiple alerts associated with a same user in the cyber incident, the binary labels assigned to respective cyber incidents, wherein each of the binary labels has a first value indicating the respective cyber incident is benign, or a second value indicating the respective incident is malicious, and wherein the soft labels are indicative of suspiciousness levels of the cyber incidents;

generating a given cyber incident comprising an alert corresponding to one or more suspicious behavioral activities in a computer system;

assigning a risk score to the given cyber incident using the trained machine learning model; and initiating a responsive action responsively to the risk score.

16. The method according to claim 15, wherein generating the given cyber incident comprises generating or updating the given cyber incident so as to include at least the alert.

17. An apparatus for cybersecurity, comprising:

a memory, configured to hold a machine learning model that was trained based on soft labels derived from binary labels using one or more predefined labeling rules, each predefined labeling rule being associated with one or more features indicative of at least one of: (i) existence of a rare alert or a high severity alert in the cyber incident, (ii) existence of a rare alert combination in the cyber incident, or (iii) multiple alerts associated with a same user in the cyber incident, the binary labels assigned to respective cyber incidents, wherein each of the binary labels has a first value indicating the respective cyber incident is benign, or a second value indicating the respective incident is malicious, and wherein the soft labels are indicative of suspiciousness levels of the cyber incidents; and a processor, configured to:

generate a given cyber incident comprising an alert corresponding to one or more suspicious behavioral activities in a computer system;

assign a risk score to the given cyber incident using the trained machine learning model; and initiate a responsive action responsively to the risk score.

18. The apparatus according to claim 17, wherein the processor is configured to generate the given cyber incident by generating or updating the given cyber incident so as to include at least the alert.

19. A computer software product, comprising a non-transitory computer-readable medium in which program instructions are stored, which instructions, when read by a computer, cause the computer to receive a corpus of cyber incidents, each cyber incident comprising (i) one or more alerts indicative of suspicious activities in one or more computer systems, and (ii) one or more features characterizing the cyber incident, to further receive binary labels respectively assigned to the cyber incidents of the corpus, each of the binary labels having a first value indicating the respective cyber incident is benign, or a second value indicating the respective cyber incident is malicious, to hold one or more predefined labeling rules, each predefined labeling rule being associated with one or more features indicative of at least one of: (i) existence of a rare alert or a high severity alert in the cyber incident, (ii) existence of a rare alert combination in the cyber incident, or (iii) multiple alerts associated with a same user in the cyber incident, wherein the one or more predefined labeling rules map the binary labels to respective soft labels that are indicative of suspiciousness levels of the cyber incidents, to map the binary labels to respective soft labels, based at least on the predefined labeling rules, and to provide the cyber incidents of the corpus and the respective soft labels for training a machine learning model that, when trained, predicts risk scores for cyber incidents outside the corpus.

* * * * *